US009867180B2

(12) United States Patent
Franceschini et al.

(10) Patent No.: US 9,867,180 B2
(45) Date of Patent: Jan. 9, 2018

(54) COGNITIVE ALLOCATION OF TDMA RESOURCES IN THE PRESENCE OF A RADIO ALTIMETER

(71) Applicant: Honeywell International Inc., Morris Plains, NJ (US)

(72) Inventors: Michael R. Franceschini, Centerport, NY (US); Kelly P. Muldoon, Golden Valley, MN (US); Steven L. Timm, Golden Valley, MN (US)

(73) Assignee: Honeywell International Inc., Morris Plains, NJ (US)

( * ) Notice: Subject to any disclaimer, the term of this patent is extended or adjusted under 35 U.S.C. 154(b) by 178 days.

(21) Appl. No.: 14/972,925

(22) Filed: Dec. 17, 2015

(65) Prior Publication Data
US 2017/0181146 A1    Jun. 22, 2017

(51) Int. Cl.
*H04W 72/04* (2009.01)
*H04J 3/16* (2006.01)
(Continued)

(52) U.S. Cl.
CPC ............ *H04W 72/044* (2013.01); *H04B 7/26* (2013.01); *H04J 3/16* (2013.01); *H04W 72/048* (2013.01);
(Continued)

(58) Field of Classification Search
CPC .............................. H04W 72/044; H04B 7/26
See application file for complete search history.

(56) References Cited

U.S. PATENT DOCUMENTS 3,742,498 A    6/1973    Dunn
4,359,733 A *  11/1982   O'Neill ..................... G01S 5/14
                                                     342/357.31
(Continued)

FOREIGN PATENT DOCUMENTS

EP    0816866    1/1998
EP    1835668    9/2007
(Continued)

OTHER PUBLICATIONS

Franceschini et al., "Frequency Modulated Continuous Wave Radio Altimeter Spectral Monitoring", "U.S Appl. No. 14/972,880, filed Dec. 17, 2015", pp. 1-27, Published in: US.
(Continued)

*Primary Examiner* — Parth Patel
(74) *Attorney, Agent, or Firm* — Fogg & Powers LLC

(57) ABSTRACT

In one embodiment, a wireless device network comprises: a plurality of device nodes using TDMA, the plurality of device nodes configured to transmit during a future TDMA frame of communication on channels having timeslots; and a timeslot allocation function comprising a processor and a memory, the processor configured to: receive signal characterization data characterizing a radio altimeter signal; using the signal characterization data, predict a frequency of the radio altimeter signal during the future TDMA frame of communication; identify conflicting timeslots for respective channels, wherein the predicted frequency of the radio altimeter signal overlaps with the respective channels during conflicting timeslots; and transmit a TDMA timeslot allocation, for wireless communications during the future TDMA frame of communication, to the plurality of device nodes, the TDMA timeslot allocation including non-conflicting timeslots where the predicted frequency of the radio
(Continued)

altimeter signal does not overlap with the respective channels during non-conflicting timeslots.

20 Claims, 5 Drawing Sheets

(51) Int. Cl.
*H04W 72/12* (2009.01)
*H04B 7/26* (2006.01)
*H04W 72/08* (2009.01)
(52) U.S. Cl.
CPC ........ *H04W 72/12* (2013.01); *H04W 72/0446* (2013.01); *H04W 72/082* (2013.01)

(56) References Cited

U.S. PATENT DOCUMENTS

| | | | |
|---|---|---|---|
| 4,427,981 A | 1/1984 | Kyriakos | |
| 5,142,533 A * | 8/1992 | Crisler | H04J 3/1694 370/348 |
| 5,574,979 A | 11/1996 | West | |
| 6,314,366 B1 * | 11/2001 | Farmakis | B60R 25/102 340/961 |
| 6,377,565 B1 * | 4/2002 | Puckette, IV | H04J 3/0682 370/337 |
| 6,801,951 B1 | 10/2004 | Roden, III | |
| 6,850,553 B1 | 2/2005 | Waschka et al. | |
| 6,941,110 B2 | 9/2005 | Kloper et al. | |
| 7,069,076 B2 | 6/2006 | Hedberg et al. | |
| 7,440,427 B1 * | 10/2008 | Katz | H04B 7/212 370/321 |
| 7,561,591 B2 * | 7/2009 | Hiraoka | H04B 7/2656 370/337 |
| 7,634,275 B2 | 12/2009 | Odman | |
| 7,683,827 B2 | 3/2010 | Kelly, Jr. et al. | |
| 7,873,739 B2 * | 1/2011 | Hall | H04L 12/417 370/345 |
| 8,188,911 B2 | 5/2012 | Beasley | |
| 8,908,573 B1 * | 12/2014 | Wang | H04L 5/26 370/280 |
| 9,065,645 B2 * | 6/2015 | Yang | H04L 1/1614 |
| 2002/0072853 A1 * | 6/2002 | Sullivan | G01S 5/0036 701/485 |
| 2003/0035173 A1 | 2/2003 | Byers et al. | |
| 2005/0090201 A1 | 4/2005 | Lengies et al. | |
| 2005/0179583 A1 | 8/2005 | Jordan et al. | |
| 2005/0182530 A1 * | 8/2005 | Murphy | G01S 19/15 701/16 |
| 2006/0109831 A1 * | 5/2006 | Tillotson | H04W 72/0446 370/342 |
| 2006/0114862 A1 * | 6/2006 | Hiraoka | H04B 7/2656 370/337 |
| 2006/0172705 A1 * | 8/2006 | Parthasarathy | H04W 16/14 455/67.11 |
| 2007/0268819 A1 * | 11/2007 | Johansson | G06F 11/004 370/216 |
| 2007/0268884 A1 * | 11/2007 | Kolavennu | H04W 16/14 370/350 |
| 2009/0083606 A1 | 3/2009 | Choi et al. | |
| 2009/0097468 A1 * | 4/2009 | Yi | G01D 21/00 370/347 |
| 2009/0116461 A1 * | 5/2009 | Yonge, III | H04L 12/2801 370/337 |
| 2009/0174594 A1 | 7/2009 | Thomas et al. | |
| 2010/0085236 A1 | 4/2010 | Franceschini | |
| 2010/0142590 A1 * | 6/2010 | Hohne | H04B 7/0617 375/141 |
| 2011/0013526 A1 * | 1/2011 | Mosko | H04W 72/085 370/252 |
| 2012/0026941 A1 | 2/2012 | Ahmad et al. | |
| 2012/0188998 A1 | 7/2012 | Philips et al. | |
| 2013/0051381 A1 * | 2/2013 | Bracha | H04W 56/00 370/338 |
| 2013/0170505 A1 * | 7/2013 | Nemeth | H04L 12/407 370/442 |
| 2013/0230035 A1 | 9/2013 | Grandhi et al. | |
| 2014/0105194 A1 | 4/2014 | Wiatrowski et al. | |
| 2014/0348140 A1 * | 11/2014 | Atkinson | H04L 12/417 370/336 |
| 2015/0003468 A1 * | 1/2015 | Thubert | H04B 7/2643 370/442 |
| 2015/0078297 A1 * | 3/2015 | Zheng | H04W 76/023 370/329 |
| 2015/0092642 A1 * | 4/2015 | Geboff | H04W 4/008 370/311 |
| 2015/0110004 A1 * | 4/2015 | Katz | H04W 28/18 370/329 |
| 2015/0229133 A1 * | 8/2015 | Reynolds | H04W 52/281 307/24 |
| 2015/0365155 A1 * | 12/2015 | Subramanian | H04B 7/0697 370/329 |
| 2016/0029409 A1 * | 1/2016 | Mueller | H04W 76/025 370/329 |
| 2017/0171088 A1 * | 6/2017 | Shor | H04L 47/30 |
| 2017/0176588 A1 * | 6/2017 | Franceschini | G01S 13/882 |
| 2017/0180040 A1 * | 6/2017 | Wang | H04B 7/265 |
| 2017/0180072 A1 * | 6/2017 | Timm | H04J 3/1694 |
| 2017/0230916 A1 * | 8/2017 | Stein | H04W 52/34 |

FOREIGN PATENT DOCUMENTS

| | | |
|---|---|---|
| EP | 1930743 | 6/2008 |
| WO | 9605562 | 2/1996 |
| WO | 0199300 | 12/2001 |
| WO | 03001742 | 1/2003 |
| WO | 2014078811 | 5/2014 |
| WO | 2016054440 | 4/2016 |
| WO | 2016142837 | 9/2016 |

OTHER PUBLICATIONS

Timm et al., "Systems and Methods to Synchronize Wireless Devices in the Presence of a FMCW Radio Altimeter", "U.S. Appl. No. 14/972,898, filed Dec. 17, 2015", pp. 1-27, Published: US.
"Characteristics of WAIC systems and bandwidth requirements to support their safe operation", "Radiocommunication Study Groups", Dec. 2012, pp. 1-71, Publisher: International Telecommunication Union.
Bluemm et al., "Wireless Aircraft Cabin Communication—An ISM-Band Cognitive Radio Approach", "8th Karlsruhe Workshop on Software Radio", 2014, pp. 127-135.
"Technical characteristics and spectrum requirements of Wireless Avionics Intra-Communications systems to support their safe operation", "M Series Mobile, radiodeteremination, amateur and related satellite services", Dec. 2013, pp. 1-76, Publisher: International Telecommunication Union.
"Technical characteristics and operational objectives for wireless avionics intra-communications (WAIC)", "M Series Mobile, radiodetermination, amateur and related satellites services", Nov. 2010, pp. i-56, Publisher: International Telecommunication Union.
"Wireless Avionics Intra-Communications (WAIC) An Overview and Application Examples", 2011.
"WAIC Wireless Avionics Intra-Communications", Dec. 9, 2011, pp. 1-2, Publisher: Aerospace Vehicle Systems Institute.
Wattenhofer, "Clock Synchronization", "Ad Hoc and Sensor Networks", Nov. 16, 2009, pp. 1-11.
"Beacon frame", "downloaded from Wikipedia Jul. 20, 2015", Jul. 20, 2015, pp. 1-3.
"European Common Proposals for the Work of the Conference", "World Radiocommunication Conference (WRC-15) dowloaded from internet on Jul. 20, 2015", pp. 1-3.
European Patent Office, "Extended European Search Report for EP Application No. 16203907.7", "Foreign counterpart to U.S. Appl. No. 14/972,925", dated Apr. 18, 2017, pp. 1-6, Published in: EP.
European Patent Office, "Extended European Search Report for EP Application No. 16199899.2", "Foreign counterpart to U.S. Appl. No. 14/972,880", dated May 10, 2017, pp. 1-9.

(56) References Cited

OTHER PUBLICATIONS

European Patent Office, "Extended European Search Report for EP Application No. 16199897.6", "Foreign counterpart to U.S. Appl. No. 14/972,898", dated May 11, 2017, pp. 1-6, Published in: EP.
2nd Meeting CPG PTC, London, Apr. 16-19, 2013, "Subject: Proposed Updates to the Working Documents Towards a Preliminary Draft New Report M [WAIC Bands]", "Consideration of the Aeronautical mobile (route), aeronautical mobile, and aeronautical radionavigation services allocations to accommodate wireless avionics intra-communications (WAIC)", Date Issued: Apr. 8, 2013, pp. 1-20, Publisher: European Conference of Postal and Telecommuncations Administrations (CEPT), Source: Germany.
United States Patent and Trademark Office, "Office Action", "From U.S. Appl. No. 14/972,898", dated Jun. 16, 2017, pp. 1-67, Published in: US.
"4200-4400 MHz", Mar. 1, 2014, pp. 1-9, Publisher: National Telecommunications and Information Administration, Published in: US.
Mahmood et al., "Time Synchronization Accuracy in Real-Time Wireless Sensor Networks", "Proceedings of the 2009 IEEE 9th Malaysia International Conference on Communications", Dec. 15-17, 2009, pp. 652-657, Published in: Kuala Lumpur Malaysia.
United States Patent and Trademark Office, "Final Office Action", "From U.S. Appl. No. 14/972,898", Oct. 19, 2017, pp. 1-59, Published in: US.

\* cited by examiner

COGNITIVE ALLOCATION OF TDMA RESOURCES IN THE PRESENCE OF A RADIO ALTIMETER

CROSS-REFERENCE TO RELATED APPLICATIONS

This application is related to: U.S. patent application Ser. No. 14/972,880 entitled "FREQUENCY MODULATED CONTINUOUS WAVE RADIO ALTIMETER SPECTRAL MONITORING" filed on even date herewith and U.S. patent application Ser. No. 14/972,898 entitled "SYSTEMS AND METHODS TO SYNCHRONIZE WIRELESS DEVICES IN THE PRESENCE OF A FMCW RADIO ALTIMETER" filed on even date herewith, both of which are incorporated herein by reference in their entirety.

BACKGROUND

Conventional aircraft communication systems include operational communication systems onboard the aircraft, as well as sensors for environmental safety, engine, landing gear, proximity detection, etc. Traditional communication systems require complex electrical wiring and harness fabrication which adds weight to the aircraft. These systems often rely on double or triple redundancy to mitigate the risk of cut or defective wiring.

The advent of reliable wireless communication makes feasible the use of wireless signals for onboard communications, both inside and outside the aircraft. These communication systems could be used for various applications including sensors, actuators, flight crew applications, etc. However, communications for aircraft safety services and regulation of flight require protected aeronautical spectrum that is not shared with unlicensed systems, such as Industrial, Scientific and Medical (ISM) systems or Wi-Fi. Additionally, the available frequency spectrum for such wireless avionics communications is limited.

SUMMARY

The Embodiments of the present disclosure provide systems and methods for wireless communication using Time Division Multiple Access (TDMA) over a bandwidth that is also shared with at least one Frequency Modulated Continuous Wave radio altimeter and will be understood by reading and studying the following specification.

In one embodiment, a wireless device network includes a plurality of device nodes that share a radio frequency spectrum using time-division multiple access (TDMA), wherein the plurality of device nodes are configured to transmit wireless communications on a plurality of channels during a future TDMA frame of communication, wherein each respective channel of the plurality of channels has a plurality of timeslots associated with the respective channel. The wireless device network also includes a timeslot allocation function comprising a processor and a memory. The processor is configured to: receive signal characterization data characterizing at least a first radio altimeter signal transmitted by at least a first radio altimeter; using the signal characterization data, predict a frequency of the at least a first radio altimeter signal during the future TDMA frame of communication; identify conflicting timeslots associated with each respective channel of the plurality of channels, wherein the predicted frequency of the at least a first radio altimeter signal overlaps with the respective channel during the conflicting timeslots; and transmit a TDMA timeslot allocation, for wireless communications in the future TDMA frame of communication, to the plurality of device nodes, wherein the TDMA timeslot allocation includes non-conflicting timeslots associated with each respective channel of the plurality of channels, wherein the predicted frequency of the at least a first radio altimeter signal does not overlap with the respective channel during the non-conflicting timeslots.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
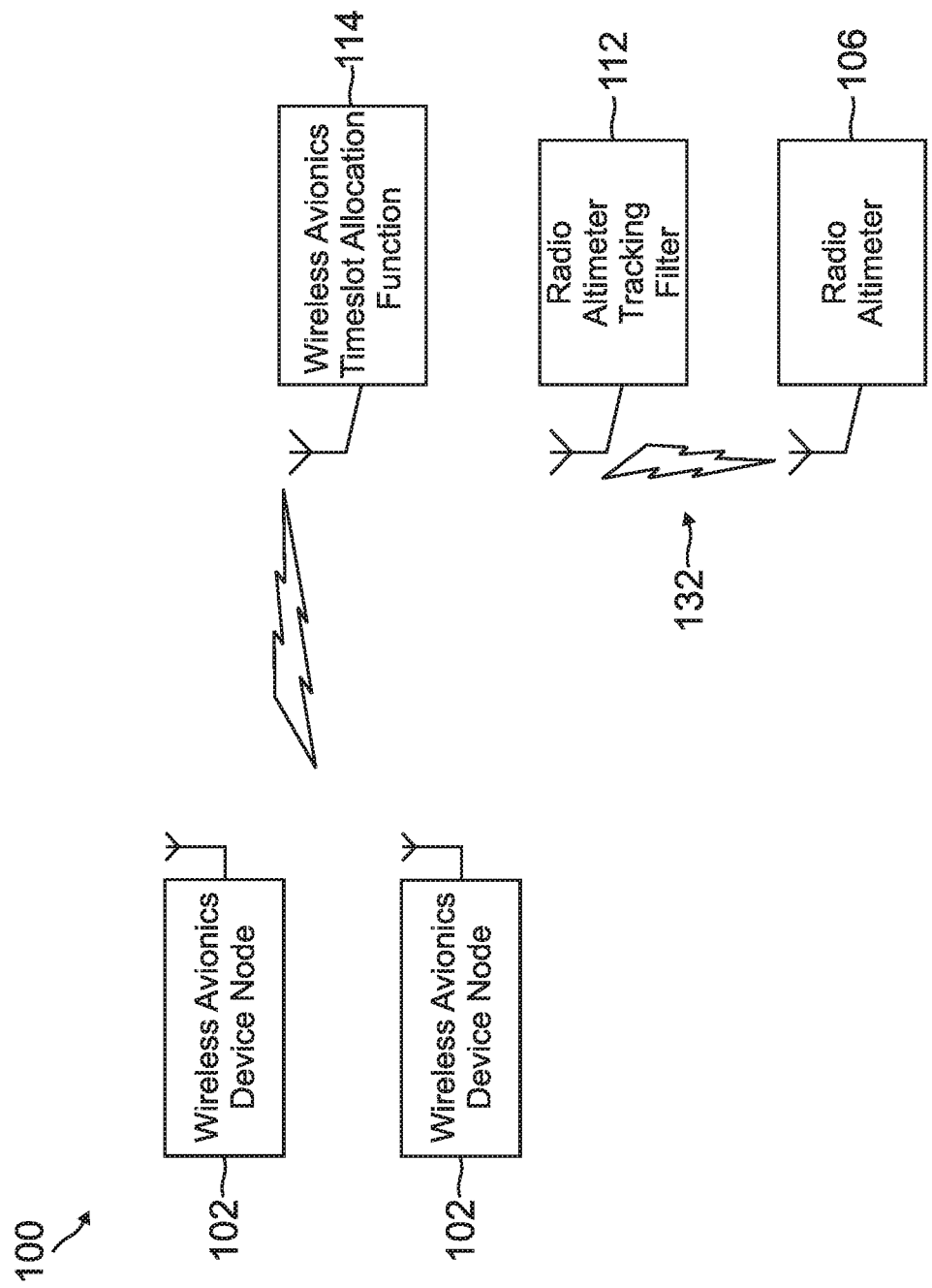
FIG. 1 is a block diagram of an example wireless device network according to an embodiment of the present disclosure.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

The embodiments described herein address the problem of limited frequency spectrum by configuring a wireless avionics system to wirelessly communicate using Time Division Multiple Access (TDMA) over a bandwidth that is also shared with at least one Frequency Modulated Continuous Wave radio altimeter. In TDMA systems, each node is allocated a period of time on a channel during a frame of communication in which it can transmit without interference from other nodes. The frames are divided into a plurality of timeslots having a particular duration, so each respective channel has a plurality of timeslots associated with it. In a wireless avionics system, a one second frame is divided into two-thousand timeslots. Each node needs to know which channel and timeslot(s) it may safely use to transmit so interference with the one or more radio altimeters and transmission collisions with other wireless avionics device nodes is avoided. This coordination effort is complicated by the frequency sweeping pattern of the radio altimeter signal because wireless transmissions must not interfere with the radio altimeter. Further, the radio altimeter signal has the potential to interfere with any frequency channel used by wireless avionics devices during any timeslot and can therefore potentially interfere with attempts to utilize a TDMA scheme.

In this disclosure, the multiple nodes of the wireless avionics system use a TDMA scheme to wirelessly communicate with each other without interfering with the conventional operation of the radio altimeter. In particular, in the spectrum of frequency channels utilized by the wireless avionics system, the wireless system's timeslot allocation function is aware of the radio altimeter signal and allocates timeslots to wireless avionics device nodes that will avoid transmitting on frequencies currently occupied by the sweeping radio altimeter signal. The operation of the radio altimeter is critical to flight safety. Therefore, the wireless avionics system is configured to share the bandwidth allocated to the radio altimeter without impacting performance of the radio altimeter or vice versa.

FIG. 1 is a block diagram illustrating a wireless device network 100 of one embodiment of the present disclosure. In some implementations, wireless device network 100 may comprise a wireless avionics network. It should be understood that the systems and methods of the present disclosure are applicable to any network using a wireless communications protocol that needs to avoid a signal that periodically sweeps a bandwidth.

Network 100 includes a plurality of device nodes 102 (also referred to herein as wireless avionics device nodes 102), one or more of which comprise wireless avionics sensors. Wireless avionics device nodes 102 share a radio frequency spectrum using a TDMA scheme where each device node 102 is granted access to transmit over an RF channel during a specified timeslot allocated to it by a Wireless Avionics Timeslot Allocation Function 114. In one embodiment, each wireless avionics system frame comprises 2000 timeslots and each 2000 timeslot wireless avionics system frame has a duration of one second. Although only two wireless avionics device nodes 102 are shown in FIG. 1, it is to be understood that this is for purposes of explanation and more than two wireless avionics device nodes 102 can be used in other embodiments. Hence, network 100 can be implemented as any avionics system onboard the aircraft which includes two or more components which communicate with each other wirelessly, either bi-directionally or in a single communication direction.

Figure 1A:
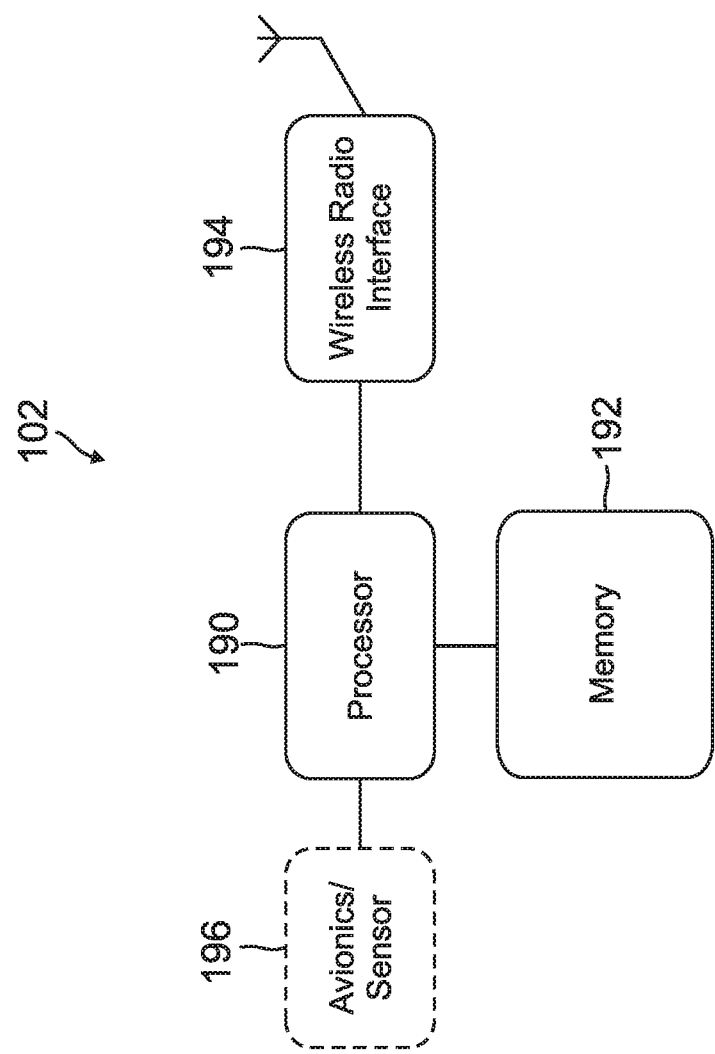
FIG. 1A is a block diagram of an example device node according to an embodiment of the present disclosure.

FIG. 1A is a block diagram illustrating one implementation of a wireless avionics device node 102 according to an example embodiment of the present disclosure, which may be used to implement any of the wireless avionics device nodes 102 shown in FIG. 1. As shown in FIG. 1A, wireless avionics device node 102 comprises a processor 190, a memory 192, and a wireless radio interface 194. Wireless avionics device node 102 may also optionally included one or more sensors 196 that input measurement data to the processor 190 to be shared with one or more other wireless avionics device nodes 102 on the network 100. The wireless avionics device nodes 102 can be any suitable component on an aircraft that needs to communicate with another component. In exemplary embodiments, a wireless avionics device node 102 can comprise an end node. For example, wireless avionics device node 102 can comprise actuators, sensors, line replaceable units and the like. Suitable actuators can include, but are not limited to, passenger speakers, passenger displays, oxygen release units, etc. which respond to commands from the flight crew to provide information to passengers or to perform an action. Additionally, suitable sensors can include, but are not limited to, brake condition monitors, tire pressure monitors, engine sensors, etc. which provide information to a control unit configured to analyze and/or provide the sensor data to a flight crew. In exemplary embodiments, a wireless avionics device node 102 can comprise a gateway node that collects data from end nodes and forwards the data to another node, a data aggregation node that collects data from the end nodes and gateway nodes, or another type of node used in a wireless avionics system.

Within each wireless avionics device node 102, the wireless radio interface 194 uses any onboard wireless technology for communication between the wireless avionics device nodes 102. Depending on the function performed by the particular node, the wireless radio interface 194 may implement a wireless transmitter, receiver, or transceiver. For example, one implementation of a device node 102 may implement a TDMA transmitter while another is coupled to a TDMA receiver. Hence, each device node 102 communicates wirelessly with other nodes 102 using a TDMA scheme.

Many commercial aircraft include one or more radio altimeters 106 configured to transmit a frequency sweeping signal 132 (e.g. Frequency Modulated Continuous Wave (FMCW) tone) with known power toward the ground or surface. The signal 132 sweeps the spectrum allocated to the radio altimeter 106 with a rate and periodicity. The rate and periodicity of the radio altimeter signal 132 varies based on the altitude of the aircraft. In exemplary embodiments, the signal 132 is a triangle wave, a square wave, or another suitable wave for a radio altimeter known to one having skill in the art. In some embodiments, the periodicity and rate of sweep of the radio altimeter signal 132 is predetermined.

In this example, the radio altimeter 106 is allocated a spectrum of 4200 MHz-4400 MHz. However, the radio altimeter 106 may only utilize a portion of the allocated spectrum. For example, the radio altimeter 106 may only utilize a span of 4235 MHz-4365 MHz. It is to be understood that other frequency spectra can be allocated for use by the radio altimeter 106 in other embodiments. Similarly, the radio altimeter 106 may utilize other portions of the allocated spectrum in other embodiments. The signal 132 interacts with the ground or surface beneath the aircraft and part of the incident signal reflects back to the radio altimeter 106. By measuring the amount of time it takes to receive the reflection, the radio altimeter 106 is able to determine the altitude of the aircraft on which the network 100 is located.

Since the radio altimeter signal 132 sweeps through the allocated bandwidth used by the network 100, the radio altimeter 106 is only using a portion of the allocated bandwidth at a given point in time. As mentioned above, Wireless Avionics Timeslot Allocation Function 114 is aware of the sweeping radio altimeter signal 132 produced by the on-board radio altimeter 106 and allocates timeslots to wireless avionics device nodes 102 that will avoid transmitting on frequencies currently occupied by the radio altimeter signal 132. In one embodiment, Wireless Avionics Timeslot Allocation Function 114 is coupled to a Radio Altimeter Tracking Filter 112 that provides inputs including the current amplitude and period of the radio altimeter signal 132 as well as the current frequency and/or channels occupied by the radio altimeter signal 132. Details regarding the tracking and characterization of the radio altimeter signal 132, such as performed by Radio Altimeter Tracking Filter 112, is the subject of U.S. patent application Ser. No. 14/972,880 which is incorporated herein by reference. In short, Radio Altimeter Tracking Filter 112 monitors the radio altimeter signal 132 transmitted by the aircraft's radio altimeter 106 and characterizes the signal 132 by determining the current amplitude and period of the radio altimeter signal pattern. In some embodiments, the Radio Altimeter Tracking Filter 112 also predicts the amplitude and period of the radio altimeter signal 132 into the future.

Figure 1B:
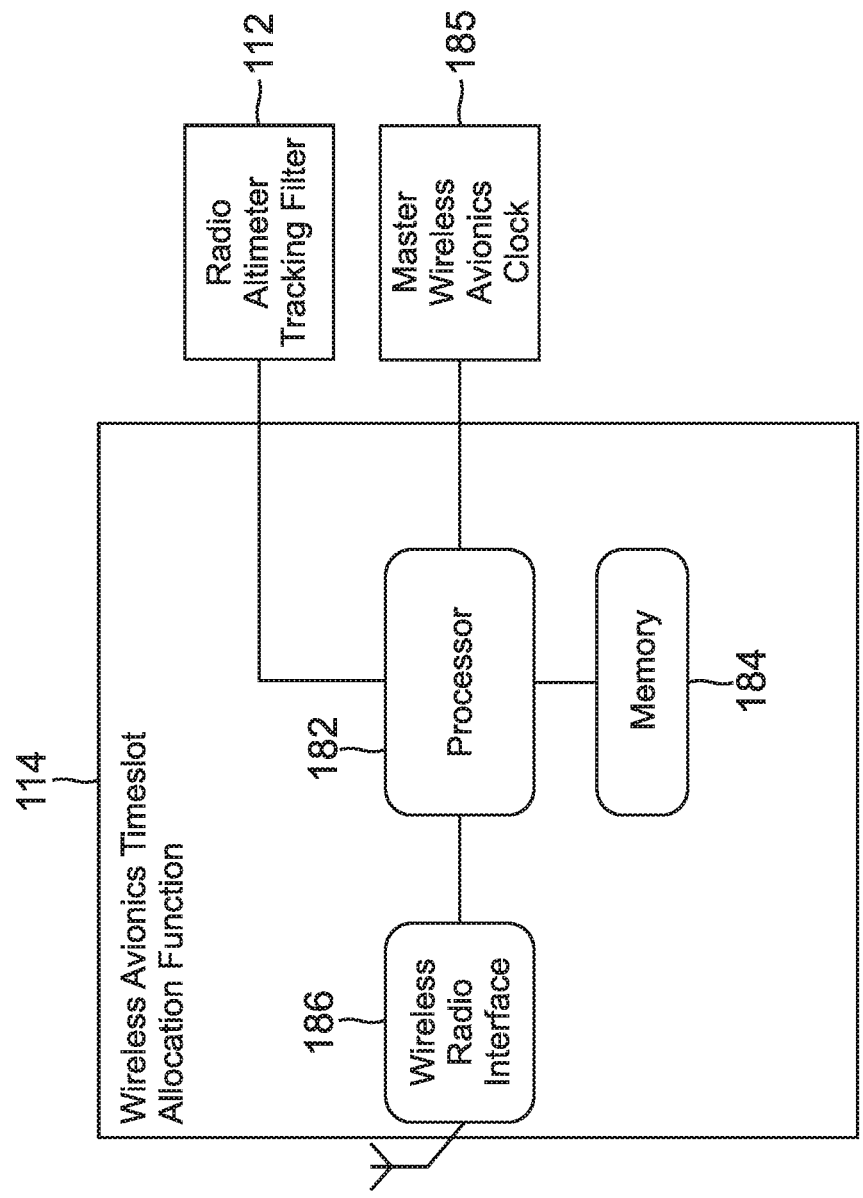
FIG. 1B is a block diagram of an example timeslot allocation function according to an embodiment of the present disclosure.

FIG. 1B is a block diagram illustrating one implementation of a Wireless Avionics Timeslot Allocation Function 114 according to an example embodiment of the present disclosure. Although shown as separate devices in FIG. 1, it should be appreciated that Wireless Avionics Timeslot Allocation Function 114 may be integrated with Radio Altimeter Tracking Filter 112. As shown in FIG. 1B, in one implementation, Wireless Avionics Timeslot Allocation Function 114 comprises a processor 182, memory 184, and a wireless radio interface 186 which are programed to implement the functions of the Wireless Avionics Timeslot Allocation Function 114 described herein. Wireless Avionics Timeslot Allocation Function 114 is locked to the Master Wireless Avionics Clock 185 and uses the Master Wireless Avionics Clock 185 to maintain timeslot timing. In exemplary embodiments, the processor 182 can be implemented using a field programmable gate array (FPGA), an application specific integrated circuit (ASIC), a microprocessor, or the like.

Using data provided by the Radio Altimeter Tracking Filter 112, Wireless Avionics Timeslot Allocation Function 114 predicts the frequency of the radio altimeter signal 132 into the future using the following equation:

$$\text{Frequency} = \left(\frac{A}{P}\right) * (P - \text{abs}(t \, \% (2*P) - P)) \quad (1)$$

where: A is the amplitude, P is the period of the sweep, and t is time. As discussed above, a frame of communication occurs on a plurality of channels and communication on each respective channel is divided into a plurality of timeslots. The Wireless Avionics Timeslot Allocation Function 114 predicts the frequency of the signal 132 of the radio altimeter 106 for a future frame of communication during the present frame of communication. For example, during frame 1, the Wireless Avionics Timeslot Allocation Function 114 predicts the frequency of the radio altimeter signal 132 for all points in time in frame 2. In other exemplary embodiments, the Wireless Avionics Timeslot Allocation Function 114 predicts the frequency of the signal 132 further into the future. The amount of time into the future that the Wireless Avionics Timeslot Allocation Function 114 can predict is limited by the accuracy of the prediction. Since the radio altimeter and the wireless device network 100 are both critical to flight safety, interference cannot occur between the radio altimeter signal 132 and TDMA transmissions by the wireless avionics device nodes 102. In exemplary embodiments, the wireless device network 100 includes additional safeguards to ensure that interference is mitigated. For example, wireless device network 100 may utilize cyclical redundancy checks, forward error correction, redundancy, and the like.

Based on the predicted frequency of the radio altimeter signal 132, the Wireless Avionics Timeslot Allocation Function 114 identifies conflicting timeslots associated with each respective channel of the plurality of channels, wherein the predicted frequency of the radio altimeter signal overlaps with the respective channel during the conflicting timeslots. The Wireless Avionics Timeslot Allocation Function 114 then transmits a TDMA timeslot allocation, for wireless communications during the future TDMA frame of communication, to the wireless avionics device nodes 102. The TDMA timeslot allocation includes non-conflicting timeslots associated with each respective channel of the plurality of channels, wherein the predicted frequency of the first radio altimeter signal does not overlap with the respective channel during the non-conflicting timeslots. In other words, Wireless Avionics Timeslot Allocation Function 114 is configured to allocate timeslots on a TDMA basis to the wireless avionics device nodes 102 in the portion of the frequency spectrum not currently in use by the radio altimeter 106 and to prevent transmission on particular channels during timeslots when they conflict with the frequency of the radio altimeter signal 132. Thus, the Wireless Avionics Timeslot Allocation Function 114 is configured to allocate timeslots and channels for the TDMA transmissions so the TDMA transmissions do not overlap with the predicted frequency of the signal 132 from the radio altimeter 106. In one embodiment, the Timeslot Allocation Function 114 transmits the TDMA timeslot allocation to the wireless avionics device nodes 102 via the wireless radio interface 186 coupled to processor 182. The wireless avionics device nodes 102 use the TDMA timeslot allocation to transmit and receive wireless communications during the future TDMA frame of communication.

Figure 2:
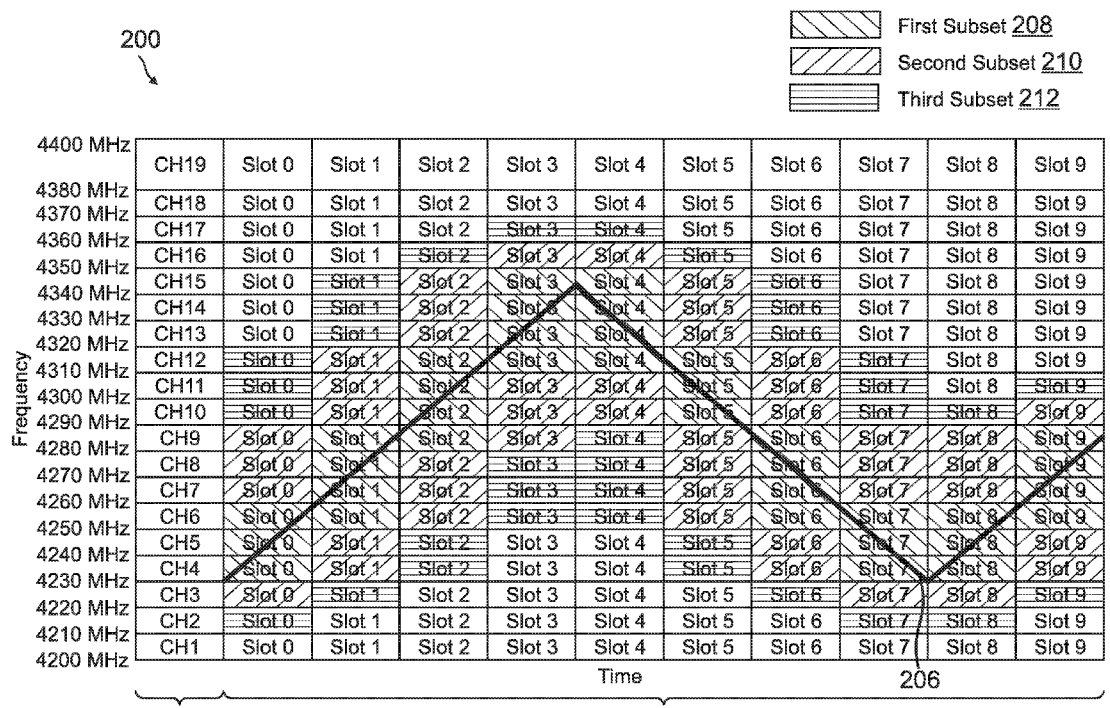
FIG. 2 is an example time-frequency grid for time division multiple access communication according to an embodiment of the present disclosure.

In exemplary embodiments, the Timeslot Allocation Function 114 is further configured to create a time-frequency grid for frames of communication in the future based on the input from the Radio Altimeter Tracking Filter 112 as shown in FIG. 2. More specifically, FIG. 2 illustrates a portion of an exemplary time-frequency grid 200 for the frequency spectrum allocated to the radio altimeter 106. The time-frequency grid 200 is a two-dimensional grid that includes a plurality of cells 202 having a time dimension and a frequency dimension. In the example of FIG. 2, the time dimension the plurality of cells 202 is defined using timeslots and the frequency dimension the plurality of cells 202 is defined using channels 204. Thus, each cells 202 of the time-frequency grid 200 corresponds to communication opportunities on a particular channel 204 during a particular timeslot. The time-frequency grid 200 can be used for allocation of timeslots to the wireless avionics device nodes 102. While FIG. 2 illustrates a particular number of channels 204 and particular bandwidths of the channels 204, it should be understood that this is for ease of illustration and the number of channels 204 and bandwidth of the channels 204 can vary depending on the requirements of the system. Further, while FIG. 2 depicts each cell 202 only assigned to a single channel 204, it should also be understood that this is for ease of illustration and a cell 202 can correspond to one or more channels 204. As used herein, the term "subset" refers to an exclusive group of at least one, but less than all, of the plurality of cells 202. Thus, each cell 202 can be a member of only one subset.

FIG. 2 also depicts a predicted signal 206 corresponding to the sweeping radio altimeter signal 132 of the radio altimeter as it sweeps from approximately 4230 MHz to 4345 MHz. It should be understood that this is for illustrative purposes and the network 100 does not require the signal 206 to appear in the time-frequency grid 200. Any cell 202 in the time-frequency grid 200 that overlaps with the signal 206 of the radio altimeter is assigned to a first subset of cells 208. To avoid interference between the wireless communications by the device nodes 102 and the signal 206 as the signal 206 sweeps through the spectrum, the Timeslot Allocation Function 114 prevents communication corresponding to the first subset of cells 208. For example, in FIG. 2, the predicted signal 206 sweeps from approximately 4230

MHz to 4257 MHz during timeslot 0. Therefore, the Timeslot Allocation Function 114 would prevent communication corresponding to the cells that include the range of frequencies from 4230-4257 MHz during timeslot 0. In particular, no communication would be allowed on the channels 4-6 that include the range of frequencies from 4230-4257 MHz during timeslot 0. The Timeslot Allocation Function 114 is configured to prevent communication corresponding to all cells 202 in the first subset of cells 208 during the future TDMA frame of communication. Therefore, the wireless communications by the device nodes 102 never overlap with the predicted signal 206 of the radio altimeter 106. Since the predicted signal 206 of the radio altimeter 106 is sweeping a frequency range, cells 202 corresponding to the same channel 204 can be assigned to different subsets in the time-frequency grid 200 depending on the particular timeslot during the frame of communication.

To further ensure that the wireless communications do not interfere with the radio altimeter, the Timeslot Allocation Function 114 can also assign cells 202 to a safety zone, which includes one or more subsets of cells 202 around the first subset of cells 208. In particular, the Timeslot Allocation Function 114 can assign different restrictions on subsets of cells that are near, but not overlapping, the predicted signal 206 during a timeslot. The subsets can be defined by the proximity of the cells 202 to the first subset of cells 208 that overlap the predicted signal 206. For example, cells 202 that are directly adjacent to the first subset of cells 208 are assigned to a second subset of cells 210, and cells that are directly adjacent to the second subset of cells 210 are assigned to a third subset of cells 212. In exemplary embodiments, the thickness of the safety zone and/or subsets of cells 202 can be varied. In some embodiments, distinct subsets of cells 202 can be combined to form thicker subsets of cells 202. In some embodiments, the size of the cells 202 can also be modified by increasing or decreasing the amount of channels 204 or timeslots available for communication. For example, increasing the amount of channels available for communication results in smaller bandwidths of the channels, which can provide more flexibility for the subsets of cells included in the safety zone. The remaining cells 202 in the time-frequency grid 200 that do not fall within the safety zone are assigned to a fourth subset of the plurality of cells 202, where communication corresponding to the fourth subset of the plurality of cells 202 is available without restriction.

In some embodiments, communication corresponding to the second subset of cells 210 could also be disabled. In other embodiments, communication corresponding to the second subset of cells 210 can be reserved for critical data communication only. Communication corresponding to the third subset of cells 212 occurs more frequently than communication corresponding to the second subset of cells 210. In exemplary embodiments, the Wireless Avionics Timeslot Allocation Function 114 prioritizes communication corresponding to each subset differently. For example, the Wireless Avionics Timeslot Allocation Function 114 can allocate timeslots corresponding to the fourth subset of cells before the third subset of cells 212 and can allocate timeslots corresponding to the third subset of cells 212 before the second subset of cells 210.

In one sense, the embodiments described herein, by tailoring timeslot allocations, the Wireless Avionics Timeslot Allocation Function 114 prevents wireless communications on particular channels during timeslots where the radio altimeter 106 would interfere with the particular channels. Therefore, the wireless device network 100 can utilize the maximum amount of the frequency spectrum allocated to the radio altimeter 106, within the margins of safety, without interfering with the radio altimeter 106. The embodiments described herein alleviate the problem of limited bandwidth for wireless communication between avionic components by permitting effective sharing of the bandwidth without interference to either the radio altimeter 106 or the communications between avionic components.

In other implementations, the wireless device network 100 described above could also operate in an environment that includes more than one radio altimeter configured to transmit a frequency sweeping signal. For example, the particular aircraft could include two radio altimeters (left and right) or three radio altimeters (left, center, and right). In such embodiments, the Radio Altimeter Tracking Filter 112 is configured to track the frequency of the signals from each radar altimeter and the Wireless Avionics Timeslot Allocation Function 114 allocates timeslots and channels so that wireless transmissions by the wireless avionics device nodes 102 do not overlap with the frequency of the signal from any of the radio altimeters. In some embodiments, the frequency spectrum allocated to each radio altimeter overlaps with the frequency spectrum allocated to other radio altimeters. In other embodiments, the frequency spectrum allocated to each radio altimeter does not overlap with the frequency spectrum allocated to other radio altimeters.

Figure 3:
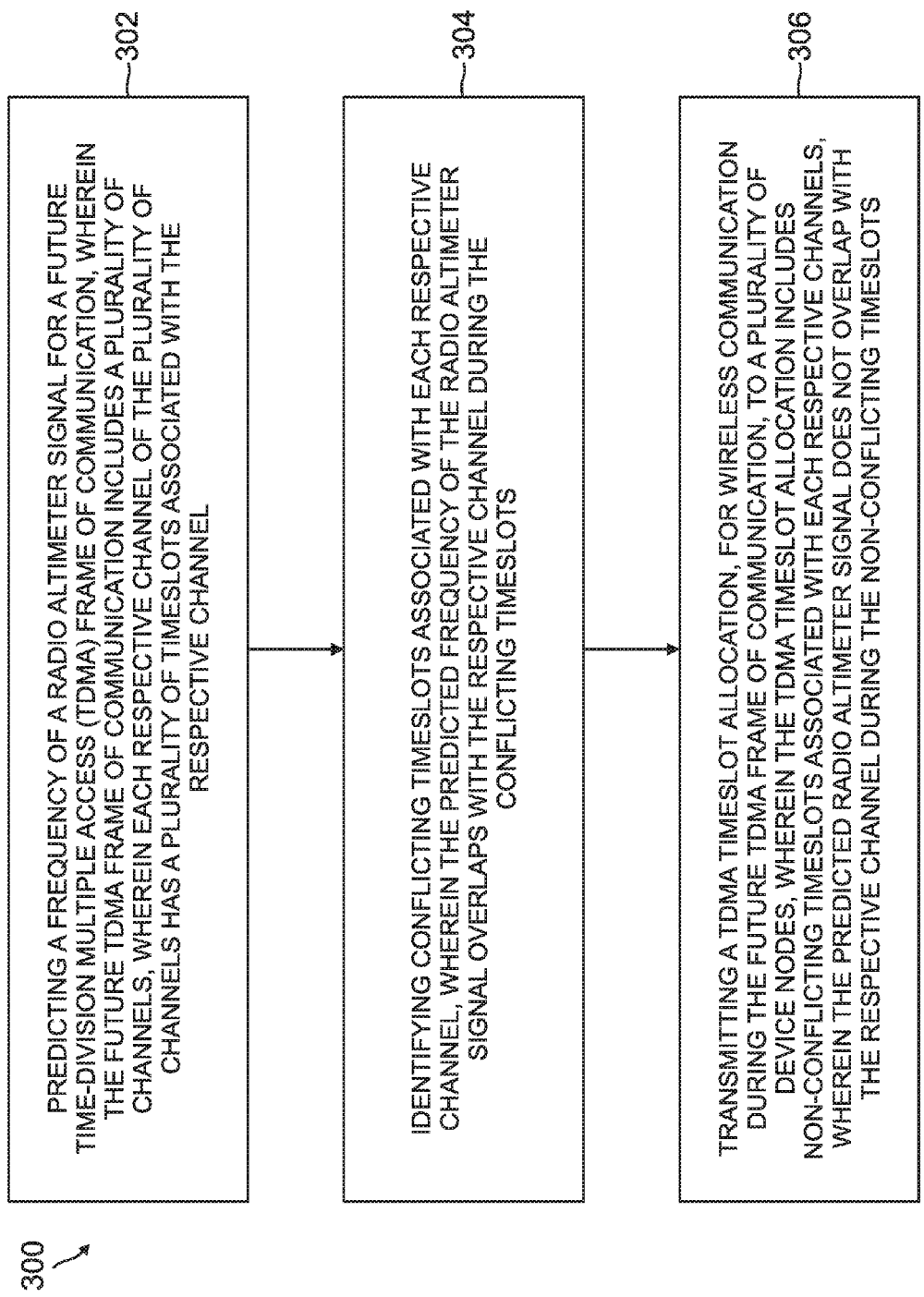
FIG. 3 is a flow chart illustrating an exemplary method of communicating data according to an embodiment of the present disclosure.

FIG. 3 is a flow chart illustrating a method of one embodiment of the present disclosure. It should be understood that methods 300 may be implemented using any one of the embodiments described above. As such, elements of method 300 may be used in conjunction with, in combination with, or substituted for elements of the embodiments described above. Further, the functions, structures and other description of elements for such embodiments described above may apply to like named elements of method 300 and vice versa.

The method 300 begins at 302 with predicting a frequency of a radio altimeter signal for a future time-division multiple access (TDMA) frame of communication, wherein the future TDMA frame of communication includes a plurality of channels, wherein each respective channel of the plurality of channels has a plurality of timeslots associated with the respective channel. In exemplary embodiments, predicting the frequency of the radio altimeter signal includes tracking the characteristics of the FMCW radio altimeter signal during the present frame of communication. For example, this could include tracking the periodicity, sweep rate, and the amplitude of the FMCW radio altimeter signal. In exemplary embodiments, the future TDMA frame of communication is the next TDMA frame of communication.

The method 300 proceeds to 304 with identifying conflicting timeslots associated with each respective channel, wherein the predicted frequency of the radio altimeter signal overlaps with the respective channel during the conflicting timeslots. In exemplary embodiments, identifying conflicting timeslots associated with each respective channel includes creating a two-dimensional time-frequency grid having a plurality of cells for the future frame of communication. In such embodiments, creating the time-frequency grid for the future frame of communication can also include generating a safety zone of restricted communication including timeslots associated with the respective channel that are adjacent to conflicting timeslots associated with the respective channel.

The method 300 proceeds to 306 with transmitting a TDMA timeslot allocation, for wireless communications during the future TDMA frame of communication, to a plurality of device nodes, wherein the TDMA timeslot allocation includes non-conflicting timeslots associated with each respective channel, wherein the predicted frequency of the radio altimeter signal does not overlap with the respective channel during the non-conflicting timeslots. In exemplary embodiments, the TDMA timeslot allocation is transmitted for the next TDMA frame of communication during the present TDMA frame of communication.

Example Embodiments

Example 1 includes a wireless device network comprising: a plurality of device nodes that share a radio frequency spectrum using time-division multiple access (TDMA), wherein the plurality of device nodes are configured to transmit wireless communications on a plurality of channels during a future TDMA frame of communication, wherein each respective channel of the plurality of channels has a plurality of timeslots associated with the respective channel; and a timeslot allocation function comprising a processor and a memory, the processor configured to: receive signal characterization data characterizing at least a first radio altimeter signal transmitted by at least a first radio altimeter; using the signal characterization data, predict a frequency of the at least a first radio altimeter signal during the future TDMA frame of communication; identify conflicting timeslots associated with each respective channel of the plurality of channels, wherein the predicted frequency of the at least a first radio altimeter signal overlaps with the respective channel during the conflicting timeslots; and transmit a TDMA timeslot allocation, for wireless communications during the future TDMA frame of communication, to the plurality of device nodes, wherein the TDMA timeslot allocation includes non-conflicting timeslots associated with each respective channel of the plurality of channels, wherein the predicted frequency of the at least a first radio altimeter signal does not overlap with the respective channel during the non-conflicting timeslots.

Example 2 includes the wireless device network of Example 1, wherein the timeslot allocation function is further configured to generate a time-frequency grid for the future TDMA frame of communication, wherein the time-frequency grid includes a plurality of cells with a time dimension and a frequency dimension, wherein each cell corresponds to one or more respective channels of the plurality of channels and a single timeslot of the plurality of timeslots.

Example 3 includes the wireless device network of Example 2, wherein identify conflicting timeslots associated with each respective channel of the plurality of channels includes identifying a first subset of the plurality of cells where the predicted frequency of the at least a first radio altimeter signal overlaps with the first subset of the plurality of cells, wherein the first subset of the plurality of cells corresponds to the conflicting timeslots.

Example 4 includes the wireless device network of Example 3, wherein the time-frequency grid includes a safety zone around the first subset of the plurality of cells, wherein the safety zone comprises at least one subset of the plurality cells adjacent to the first subset of the plurality cells.

Example 5 includes the wireless device network of Example 4, wherein the safety zone includes a second subset of the plurality of cells and a third subset of the plurality of cells, wherein cells directly adjacent to the first subset of the plurality of cells are assigned to the second subset of the plurality of cells, and cells directly adjacent to the second subset of the plurality of cells are assigned to the third subset of the plurality of cells.

Example 6 includes the wireless device network of Example 5, wherein cells not assigned to the safety zone are assigned to a fourth subset of the plurality of cells, wherein communications corresponding to the fourth subset of the plurality of cells do not have restrictions.

Example 7 includes the wireless device network of Example 6, wherein the second, third, and fourth subsets of cells correspond to non-conflicting timeslots.

Example 8 includes the wireless device network of Example 7, wherein communications corresponding to the third subset of the plurality of cells are assigned before communications corresponding to the second subset of the plurality of cells.

Example 9 includes the wireless device network of Example 8, wherein communications corresponding to fourth subset of the plurality of cells are assigned before communications corresponding to the second or third subsets of the plurality of cells.

Example 10 includes the wireless device network of any of Examples 1-9, wherein the at least a first radio altimeter signal is a frequency modulated continuous wave (FMCW) signal.

Example 11 includes the wireless device network of any of Examples 1-10, wherein the processor is further configured to: receive signal characterization data characterizing a second radio altimeter signal transmitted by a second radio altimeter; using the signal characterization data, predict a frequency of the second radio altimeter signal during the future TDMA frame of communication; and wherein the conflicting timeslots associated with each respective channel of the plurality of channels further include timeslots on the respective channel where the predicted frequency of the second radio altimeter signal overlaps with the respective channel during the conflicting timeslots; and wherein the non-conflicting timeslots associated with each respective channel of the plurality of channels only include timeslots on the respective channel where the predicted frequency of the at least a first radio altimeter signal and the predicted frequency of the second radio altimeter signal do not overlap with the respective channel during the non-conflicting timeslots.

Example 12 includes the wireless device network of any of Examples 1-11, wherein the plurality of device nodes comprise wireless avionics device nodes.

Example 13 includes a method of communicating data, comprising: predicting a frequency of a radio altimeter signal for a future time-division multiple access (TDMA) frame of communication, wherein the future TDMA frame of communication includes a plurality of channels, wherein each respective channel of the plurality of channels has a plurality of timeslots associated with the respective channel; identifying conflicting timeslots associated with each respective channel, wherein the predicted frequency of the radio altimeter signal overlaps with the respective channel during the conflicting timeslots; and transmitting a TDMA timeslot allocation, for wireless communications during the future TDMA frame of communication, to a plurality of device nodes, wherein the TDMA timeslot allocation includes non-conflicting timeslots associated with each respective channel, wherein the radio altimeter signal does not overlap with the respective channel during the non-conflicting timeslots.

Example 14 includes the method of Example 13, wherein predicting the frequency of the radio altimeter signal includes tracking the characteristics of the radio altimeter signal during the present frame of communication.

Example 15 includes the method of Example 14, wherein the characteristics of the radio altimeter signal include at least one of periodicity, sweep rate, and amplitude.

Example 16 includes the method of any of Examples 13-15, further comprising generating a time-frequency grid for the future TDMA frame of communication, wherein the time-frequency grid includes a plurality of cells with a time dimension and a frequency dimension, wherein each cell corresponds to one or more channels of the plurality of channels and a single timeslot of the plurality of timeslots.

Example 17 includes the method of any of Examples 13-16, further comprising generating a safety zone of restricted communication around the conflicting timeslots associated with each respective channel, wherein the safety zone includes non-conflicting timeslots associated with the respective channel that are adjacent to conflicting timeslots associated with the respective channel.

Example 18 includes a timeslot allocation device for a time division multiple access (TDMA) network sharing bandwidth with a frequency sweeping element, the device comprising: a wireless radio interface; and a processor coupled to a memory, the processor configured to: receive signal characterization data characterizing a radio altimeter signal transmitted by a radio altimeter; using the signal characterization data, predict a frequency of the radio altimeter signal during a future TDMA frame of communication, wherein the future TDMA frame of communication includes a plurality of channels, wherein each respective channel of the plurality of channels has a plurality of timeslots associated with the respective channel; identify conflicting timeslots associated with each respective channel of the plurality of channels, wherein the predicted frequency of the radio altimeter signal overlaps with the respective channel during the conflicting timeslots; and transmit a TDMA timeslot allocation, for wireless communications during the future TDMA frame of communication, to a plurality of device nodes, wherein the TDMA timeslot allocation includes non-conflicting timeslots associated with each respective channel of the plurality of channels, wherein the predicted frequency of the radio altimeter signal does not overlap with the respective channel during the non-conflicting timeslots.

Example 19 includes the timeslot allocation device of Example 18, wherein the processor is further configured to generate a time-frequency grid for the future TDMA frame of communication, wherein the time-frequency grid includes a plurality of cells with a time dimension and a frequency dimension, wherein each cell corresponds to one or more channels of the plurality of channels and a particular timeslot of a plurality of timeslots.

Example 20 includes the timeslot allocation device of any of Examples 18-19, wherein the processor is further configured to generate a safety zone of restricted communication around the conflicting timeslots associated with each respective channel, wherein the safety zone includes non-conflicting timeslots associated with the respective channel that are adjacent to conflicting timeslots associated with the respective channel.

In various alternative embodiments, system elements, method steps, or examples described throughout this disclosure (such as the wireless avionics device nodes, Wireless Avionics Timeslot Allocation Function, Radio Altimeter Tracking Filter, and/or Master Wireless Avionics Clock, or sub-parts thereof, for example) may be implemented using one or more computer systems, field programmable gate arrays (FPGAs), or similar devices comprising a processor coupled to a memory (such as shown in FIG. 1, for example) and executing code to realize those elements, processes, or examples, said code stored on a non-transient data storage device. Therefore other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated Circuit (VHSIC) Hardware Description Language (VHDL).

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A wireless device network comprising:
   a plurality of device nodes that share a radio frequency spectrum using time-division multiple access (TDMA), wherein the plurality of device nodes are configured to transmit wireless communications on a plurality of channels during a future TDMA frame of communication, wherein each respective channel of the plurality of channels has a plurality of timeslots associated with the respective channel; and
   a timeslot allocation function comprising a processor and a memory, the processor configured to:
      receive signal characterization data characterizing at least a first radio altimeter signal transmitted by at least a first radio altimeter;
      using the signal characterization data, predict a frequency of at least the first radio altimeter signal during the future TDMA frame of communication;
      identify conflicting timeslots associated with each respective channel of the plurality of channels, wherein the predicted frequency of the at least a first radio altimeter signal overlaps with the respective channel during the conflicting timeslots; and
      transmit a TDMA timeslot allocation, for wireless communications during the future TDMA frame of communication, to the plurality of device nodes, wherein the TDMA timeslot allocation includes non-conflicting timeslots associated with each respective channel of the plurality of channels, wherein the predicted frequency of the at least a first radio altimeter signal does not overlap with the respective channel during the non-conflicting timeslots.

2. The wireless device network of claim 1, wherein the timeslot allocation function is further configured to generate a time-frequency grid for the future TDMA frame of communication, wherein the time-frequency grid includes a plurality of cells with a time dimension and a frequency dimension, wherein each cell corresponds to one or more respective channels of the plurality of channels and a single timeslot of the plurality of timeslots.

3. The wireless device network of claim 2, wherein identify conflicting timeslots associated with each respective channel of the plurality of channels includes identifying a first subset of the plurality of cells where the predicted frequency of at least the first radio altimeter signal overlaps with the first subset of the plurality of cells, wherein the first subset of the plurality of cells corresponds to the conflicting timeslots.

4. The wireless device network of claim 3, wherein the time-frequency grid includes a safety zone around the first subset of the plurality of cells, wherein the safety zone comprises at least one subset of the plurality cells adjacent to the first subset of the plurality cells.

5. The wireless device network of claim 4, wherein the safety zone includes a second subset of the plurality of cells and a third subset of the plurality of cells, wherein cells directly adjacent to the first subset of the plurality of cells are assigned to the second subset of the plurality of cells, and cells directly adjacent to the second subset of the plurality of cells are assigned to the third subset of the plurality of cells.

6. The wireless device network of claim 5, wherein cells not assigned to the safety zone are assigned to a fourth subset of the plurality of cells, wherein communications corresponding to the fourth subset of the plurality of cells do not have restrictions.

7. The wireless device network of claim 6, wherein the second, third, and fourth subsets of cells correspond to non-conflicting timeslots.

8. The wireless device network of claim 7, wherein communications corresponding to the third subset of the plurality of cells are assigned before communications corresponding to the second subset of the plurality of cells.

9. The wireless device network of claim 8, wherein communications corresponding to fourth subset of the plurality of cells are assigned before communications corresponding to the second or third subsets of the plurality of cells.

10. The wireless device network of claim 1, wherein the at least a first radio altimeter signal is a frequency modulated continuous wave (FMCW) signal.

11. The wireless device network of claim 1, wherein the processor is further configured to:
receive signal characterization data characterizing a second radio altimeter signal transmitted by a second radio altimeter;
using the signal characterization data, predict a frequency of the second radio altimeter signal during the future TDMA frame of communication; and
wherein the conflicting timeslots associated with each respective channel of the plurality of channels further include timeslots on the respective channel where the predicted frequency of the second radio altimeter signal overlaps with the respective channel during the conflicting timeslots; and
wherein the non-conflicting timeslots associated with each respective channel of the plurality of channels only include timeslots on the respective channel where the predicted frequency of the at least a first radio altimeter signal and the predicted frequency of the second radio altimeter signal do not overlap with the respective channel during the non-conflicting timeslots.

12. The wireless device network of claim 1, wherein the plurality of device nodes comprise wireless avionics device nodes.

13. A method of communicating data, comprising:
predicting a frequency of a radio altimeter signal for a future time-division multiple access (TDMA) frame of communication, wherein the future TDMA frame of communication includes a plurality of channels, wherein each respective channel of the plurality of channels has a plurality of timeslots associated with the respective channel;
identifying conflicting timeslots associated with each respective channel, wherein the predicted frequency of the radio altimeter signal overlaps with the respective channel during the conflicting timeslots; and
transmitting a TDMA timeslot allocation, for wireless communications during the future TDMA frame of communication, to a plurality of device nodes, wherein the TDMA timeslot allocation includes non-conflicting timeslots associated with each respective channel, wherein the radio altimeter signal does not overlap with the respective channel during the non-conflicting timeslots.

14. The method of claim 13, wherein predicting the frequency of the radio altimeter signal includes tracking the characteristics of the radio altimeter signal during the present frame of communication.

15. The method of claim 14, wherein the characteristics of the radio altimeter signal include at least one of periodicity, sweep rate, and amplitude.

16. The method of claim 13, further comprising generating a time-frequency grid for the future TDMA frame of communication, wherein the time-frequency grid includes a plurality of cells with a time dimension and a frequency dimension, wherein each cell corresponds to one or more channels of the plurality of channels and a single timeslot of the plurality of timeslots.

17. The method of claim 13, further comprising generating a safety zone of restricted communication around the conflicting timeslots associated with each respective channel, wherein the safety zone includes non-conflicting timeslots associated with the respective channel that are adjacent to conflicting timeslots associated with the respective channel.

18. A timeslot allocation device for a time division multiple access (TDMA) network sharing bandwidth with a frequency sweeping element, the device comprising:
a wireless radio interface; and
a processor coupled to a memory, the processor configured to:
receive signal characterization data characterizing a radio altimeter signal transmitted by a radio altimeter;
using the signal characterization data, predict a frequency of the radio altimeter signal during a future TDMA frame of communication, wherein the future TDMA frame of communication includes a plurality of channels, wherein each respective channel of the plurality of channels has a plurality of timeslots associated with the respective channel;
identify conflicting timeslots associated with each respective channel of the plurality of channels, wherein the predicted frequency of the radio altimeter signal overlaps with the respective channel during the conflicting timeslots; and
transmit a TDMA timeslot allocation, for wireless communications during the future TDMA frame of communication, to a plurality of device nodes, wherein the TDMA timeslot allocation includes non-conflicting timeslots associated with each respective channel of the plurality of channels, wherein the predicted frequency of the radio altimeter signal does not overlap with the respective channel during the non-conflicting timeslots.

19. The timeslot allocation device of claim 18, wherein the processor is further configured to generate a time-frequency grid for the future TDMA frame of communication, wherein the time-frequency grid includes a plurality of cells with a time dimension and a frequency dimension, wherein each cell corresponds to one or more channels of the plurality of channels and a particular timeslot of a plurality of timeslots.

20. The timeslot allocation device of claim 18, wherein the processor is further configured to generate a safety zone of restricted communication around the conflicting timeslots associated with each respective channel, wherein the safety zone includes non-conflicting timeslots associated with the respective channel that are adjacent to conflicting timeslots associated with the respective channel.

* * * * *